(12) United States Patent
McLane

(10) Patent No.: US 8,858,795 B2
(45) Date of Patent: Oct. 14, 2014

(54) FILTER APPARATUS

(76) Inventor: Jeffrey G McLane, Mt. Pleasant, SC (US)

( * ) Notice: Subject to any disclaimer, the term of this patent is extended or adjusted under 35 U.S.C. 154(b) by 876 days.

(21) Appl. No.: 13/069,309

(22) Filed: Mar. 22, 2011

(65) Prior Publication Data

US 2012/0241369 A1   Sep. 27, 2012

(51) Int. Cl.
| | | |
|---|---|---|
| *B01D 29/58* | (2006.01) | |
| *B01D 35/22* | (2006.01) | |
| *B01D 29/90* | (2006.01) | |
| *B01D 29/07* | (2006.01) | |
| *B01D 35/12* | (2006.01) | |

(52) U.S. Cl.
CPC ............... *B01D 29/58* (2013.01); *B01D 35/22* (2013.01); *B01D 29/908* (2013.01); *B01D 29/07* (2013.01); *B01D 29/906* (2013.01); *B01D 35/12* (2013.01); *B01D 2201/02* (2013.01)
USPC ........... 210/304; 210/306; 210/311; 210/313; 210/323.1; 210/335

(58) Field of Classification Search
CPC ...... B01D 29/58; B01D 29/908; B01D 35/22; B01D 2201/02
USPC ............... 210/304, 306, 311, 313, 323.1, 335
See application file for complete search history.

(56) References Cited

U.S. PATENT DOCUMENTS

| | | | | |
|---|---|---|---|---|
| 1,107,485 A | * | 8/1914 | Bowser | 210/304 |
| 1,176,732 A | * | 3/1916 | Bowser | 210/304 |
| 2,514,366 A | * | 7/1950 | Beyland | 210/442 |
| 3,640,395 A | | 2/1972 | Kinney | |
| 3,931,011 A | * | 1/1976 | Richards et al. | 210/136 |
| 4,298,465 A | | 11/1981 | Druffel | |
| 4,312,751 A | | 1/1982 | Casamitjana | |
| 4,456,529 A | | 6/1984 | Shinaver | |
| 4,502,954 A | | 3/1985 | Druffel | |
| 5,078,875 A | | 1/1992 | Losing | |
| 2006/0180527 A1 | * | 8/2006 | Blaschke et al. | 210/97 |
| 2009/0283467 A1 | | 11/2009 | Wallerstorfer et al. | |

* cited by examiner

*Primary Examiner* — Thomas M Lithgow
(74) *Attorney, Agent, or Firm* — Roger A. Jackson

(57) ABSTRACT

A fluid filter apparatus includes a first surrounding sidewall having inlet and outlet apertures, with first and second end portions, a cover attached to the second end portion and a domed end attached to the first end portion. Also included is a second surrounding sidewall with primary and secondary end portions, being co-axially disposed within the first surrounding sidewall, with a first environment interior disposed therebetween, a second environmental interior disposed within the second surrounding sidewall, and a third environmental interior disposed within said first surrounding sidewall. Further included is a primary strainer disposed between the first and second environments, a vane forming a helical channel within the first environmental adding a centrifugal velocity to the fluid to separate heavier fluids and particulates. Also, a secondary strainer is between the second and third environments, and a filter media is in a third environment.

10 Claims, 7 Drawing Sheets

FILTER APPARATUS

TECHNICAL FIELD

The present invention generally relates to an apparatus for filtering a fluid that flows through the filter apparatus. More particularly, the present invention is a fluid filter apparatus that has a substantially long life as between cleanings due to a combined effect of multi-stage filtration and centrifugal separation.

BACKGROUND OF INVENTION

A basic conventional fluid filter operates by separating the solid contaminants from the fluid by utilizing a porous barrier that allows the fluid to pass and thereby contains the solid contaminants thus separating the particulate contaminants from the fluid. The most common barrier is a screen or mesh constructed of various materials that are compatible with the fluid characteristics such as fluid pressure, fluid temperature, and fluid corrosion issues. The typical fluid filter barrier has substantially symmetric openings that are sized such that they allow contaminants through that are sized smaller than the openings and that the barrier retains contaminants that are sized larger than the openings. Almost all of the typical particulate contaminants are approximately spherical in shape and if the overall size of the contaminants is larger than the barrier openings, the individual contaminant will partially wedge itself into the barrier opening from the force of the fluid flow through the barrier, if the individual contaminant is slightly larger than the barrier, however, if the individual contaminant is markedly larger than the barrier then the individual contaminant will most likely not wedge itself into the barrier. Thus, there are multiple points of contact between the barrier opening and the contaminant thus allowing the contaminant to become wedged into the opening, resulting in shorter filter lives as the more barrier openings that are substantially blocked by the contaminants result in the filter reducing its overall fluid flow rate ability for shortening the effective life of the filter as the filter loads up with contaminants.

If, for example a back flush operation is initiated, in other words reversing the fluid flow direction through the barrier in an effort to dislodge the contaminant that is wedged in the opening, the contaminant may not easily be dislodged due to the multiple points of contact with the opening with this being coupled with the usual semi resilient nature of the barrier (that is typically constructed of paper, or a polymer, wire mesh, and the like) and the contaminant (that can be fluid soaked, or resilient itself in a non symmetrical manner), resulting in retention of the individual contaminant in the barrier opening even during a back flush operation. In addition, the fluid flow force to dislodge the contaminant from the barrier is limited by the differential pressure capability of the barrier and the mechanical strength of the filtering material.

This drawback of the individual contaminant wedging into the barrier opening has been recognized in the prior art with one solution being to reshape the openings from substantially symmetric to a non symmetric shape that is typically a long thin rectangular opening that results in the individual contaminant having only two points of contact with the barrier opening which typically results in the individual contaminant being less "wedged" into the barrier, allowing in more effective removal of the individual contaminant from the barrier by the above described back flushing procedure as previously described, wherein this is typically termed a "self cleaning" fluid filter. Also, as an enhancement and at times a necessity structurally, the long thin rectangular opening in the self cleaning fluid filter barrier is constructed of a substantially rigid material (as compared to the conventional filter barrier being constructed of a typically resilient material as previously discussed) to accommodate the long span of the long thin rectangular opening which is a positive for further facilitating the dislodging of the contaminant from the barrier during the back flushing operation. Typically, self cleaning fluid filters have two different modes of operation, the first mode is to have three continuously operating filter fluid ports that include a dirty fluid inlet port, a clean fluid outlet port, and a dirty fluid outlet port, under this mode of operation the self cleaning fluid filter is continuously cleaned (with no back flushing required) and has an uninterrupted fluid filtering operation by essentially having a continuous flow of dirty fluid, wherein a continuous clean fluid flow is "bleed off" through the self cleaning filter, as this mode being the ideal for continuous self cleaning fluid filter operation being substantially maintenance free. When a fluid flow system cannot tolerate the continuous dirty fluid flow outlet (as in the case of for example, a fuel filter system or an oil filter lubrication system in an engine), in other words the fluid system requires a filter that has a single dirty fluid inlet and a single clean fluid outlet, (i.e. being a closed loop system as is typically required on a vehicle, boat, or any other mobile equipment) this is where a self cleaning filter would require an intermittent back flushing operation which is the second mode of a self cleaning filter operation. The second mode is to have two intermittently operating filter fluid ports that include the dirty fluid inlet port and the clean fluid outlet port, wherein an intermittent back flushing operation is required to remove an accumulation of trapped fluid contaminants from the filter by reversing the fluid flow such that the clean fluid outlet becomes the clean fluid inlet and the dirty fluid inlet becomes the dirty fluid outlet, with the back flush operation continuing until substantially all of the contaminants are removed from the filter.

Another type of self cleaning "filter" is called a centrifugal separator, wherein the fluid is spun in a vortex and through the use of centrifugal force the heavier particulates are spun outward against a typically frustroconically shaped wall (usually with the narrow end downward) to settle out of the spinning fluid downwardly and the clean fluid floats out of the vortex centrally upwardly with the larger heavier particles removed. The centrifugal separator works fluid flow wise much like the previously described first mode of operation for the self cleaning filter, wherein there is no backflushing required i.e. there is a dirty fluid inlet (typically tangentially located adjacent to the frustroconical wall), a dirty fluid outlet (typically located at the bottom of the narrowed frustroconical wall), and a clean fluid outlet (typically located at the top central portion of the frustroconical chamber), wherein proper operation of the centrifugal separator is maintained by proper pressure differences and flowrates maintained between the dirty fluid inlet, the dirty fluid outlet, and the clean fluid outlet. Thus, the centrifugal separator is a continuously operating and non maintenance device, which makes it seem attractive, however, it is not really a filter and is really more of a classifier to separate heavy particulates from the lighter fluid, thus the "filtration" is by no means absolute, i.e. light particulates would not be separated out and some heavy particulates could be included in the clean fluid outlet, thus for many applications a centrifugal separator would not be desirable. A further type of self cleaning filter is a type for use with gases to remove particulate matter from a gas stream either on a conventional filter material, or including a dielectric material in the filter by polarizing the dielectric material across a pair of electrodes to electrically collect particulates from the gas stream. Then making the filter self cleaning by vaporizing the collected particulates from either a conventional filter or dielectric filter using a higher electrical potential than is used to collect the particulates in the filtration process, thus the vaporized particulates are reduced in size to be acceptably passed through the filter. A yet further type of self cleaning filter is to mechanically "scrape" the filter element of contaminate build up as part of a built in self cleaning filter apparatus.

In looking at the prior art in this area, in U.S. Pat. No. 5,078,875 to Lösing disclosed is a separator for removing dirt and water from a liquid fuel that has a rectangular cross section central portion of its housing provided with a filter and a cup shaped lower portion of the housing having a guide tube through which the liquid is introduced downwardly around a vaned helical body generating a vortex flow of the liquid before it is diverted downwardly around the guide tube into the bowl chamber. The exterior of the guide tube is formed with a pair of horizontal V-shaped feedback passages which draw droplets of the liquid of higher density downwardly to meet the flow from the interior of the guide tube before it is deflected upwardly to the final filter, thereby increasing the separation efficiency.

Further, in U.S. Pat. No. 4,298,465 to Druffel disclosed a self-contained apparatus for the separation of low density fluids, such as fuel, from higher density fluids such as water and also other particles is disclosed which may be easily retrofitted into a variety of existing new and used engines as it can selectively accommodate the various fuel line arrangements and also various obstructions of these engines. Further, the apparatus includes improved flow director means which provides for the separation of the higher density fluid and the particles from the low density fluid at an earlier stage contributing to a more complete separation prior to the filtration of the fluid. Consequently, the filter element has an extended life due to the fact that it is exposed to less higher density fluids and particles in filtering the low density fluids.

Continuing in the prior art in U.S. Pat. No. 4,312,751 to Casamitjana disclosed is a device for separating contaminants from a liquid with which such contaminants are not miscible. Casamitjana comprises an inlet and outlet portion formed with an inlet opening for allowing liquid to enter the device and an outlet opening for allowing liquid to leave the device, and a separator portion, the separator portion being releasably secured to the inlet and outlet portion and including a generally cylindrical receptacle. The cylindrical receptacle in Casamitjana which in use, is disposed with its central axis substantially vertical and with the inlet and outlet portion of the device at its upper end, and an impeller element at the upper end of the cylindrical receptacle and disposed to receive liquid entering the device by way of said inlet opening and to conduct such liquid into the receptacle while imparting a rotational component of movement thereto. Whereby the contaminants in Casamitjana are separated from the liquid by centrifugal effects and settle to the bottom of the receptacle while liquid having contaminants separated therefrom leaves the device by way of the outlet opening. Wherein the stilling vanes 9 in Casamitjana act to keep the particles and heavier fluids at the bottom of the bowl, also the inverted cone 10 helps to drive the particles and the heavier fluid toward the bottom of the bowl also.

Next, in the prior art in U.S. Pat. No. 4,456,529 to Shinaver disclosed is a filter apparatus for separating fluids of different densities. The apparatus has a relatively small housing size such that it is particularly suited for installation in passenger vehicles. The construction of the subject filter in Shinaver is intended to eliminate sealing problems found in the prior art as well as to permit the utilization of a filter having increased capacity by virtue of it being a cylindrical filter.

Further, in the prior art in U.S. Pat. No. 4,502,954 to Druffel, disclosed is a combination fuel filter and water separator which is particularly useful at the upstream, suction side of a fuel pump that includes a provision for initial settling of water and particulate material in a lower chamber, after which the fluid passes up through a backflow preventing check valve and into an upper chamber, where fine filtration takes place. In Druffel, the check valve, preferably a ball valve between the lower and upper chambers, prevents any backflow of fuel by gravity from the filter/separator assembly when a top cover is opened, e.g. for servicing of a filter element in the upper chamber. The location of the ball valve in Druffel avoids subjecting it to highly contaminated entering fuel, which could foul the valve. Associated with the inlet structure of Druffel the assembly is a channel for inducing a helical flow path for centrifugally removing water and particles while imparting a downward component of motion to them, noting that this is similar in construction to Shinaver.

Self cleaning or substantially self cleaning filters are in general highly desirable due to lower maintenance required, reducing periodic or inadvertent shutdowns of a fluid process or system i.e. by almost having completely continuous use, and are "greener" environmentally in that there is reduced disposable waste generated from used or contaminated filter elements, of which can be an environmental problem if the filtered fluid is toxic, flammable, and the like. What is needed therefore is a substantially self cleaning filter having an expanded micro filtering ability due to combining multiple filtering processes of centrifugal particulate separation, multiple stages of straining, and a final fine filtration to provide micro filtration with the longest filter assembly life before needing maintenance. This as opposed to the conventional single stage non self cleaning filter wherein all of the filter fluid flow force tends to hold the contaminates trapped into the filter element, thus further entrapping and wedging the contaminates into the filter element wherein the buildup of these contaminates occurs at a faster rate necessitating more frequent filter maintenance.

It is desired that the present invention of a self cleaning filter, have the ability to filter down to a very fine level of about 10 micron absolute, while being able to centrifugally remove heavier fluids and particles upstream of the final 10 micron absolute filter along with successive stages of finer particulate straining also removing particulates upstream of the final 10 micron absolute filter to maximize the intervals between filter maintenance in a closed loop system wherein a continuous dirty fluid outlet cannot be tolerated that a true self cleaning filter requires.

SUMMARY OF INVENTION

Broadly, the present invention of a fluid filter apparatus for helping to purify a fluid includes a first surrounding sidewall with a first end portion and an opposing second end portion, wherein the second end portion includes a dirty fluid inlet aperture disposed therethrough the first surrounding sidewall, further the second end portion also includes an outlet aperture also therethrough the first surrounding sidewall. Further included in the fluid filter apparatus is a cover that is attached to the second end portion and a domed end that is attached to the first end portion. Moving internally on the fluid filter apparatus further included is a second surrounding sidewall with a primary end portion and an opposing secondary end portion, wherein the second surrounding sidewall is substantially co-axially disposed within the first surrounding sidewall, with the primary end portion adjacent to the first end portion and the secondary end portion adjacent to the second end portion. Also included in the fluid filter apparatus is a first environment interior that is defined as being disposed as between the first and second surrounding sidewalls, a second environmental interior that is defined as being disposed within the second surrounding sidewall, and a third environmental interior that is defined as being disposed within the first surrounding sidewall where the second surrounding sidewall does not extend into.

The fluid filter apparatus also includes a primary strainer disposed as between the first environment interior and the second environment interior, wherein the primary strainer is adjacent to the primary end portion, further a vane that forms a continuous helical channel within the first environmental interior that is operational to direct the dirty fluid from the fluid inlet aperture to the primary strainer and to add a centrifugal velocity to the fluid in order to drive heavier fluid portions and particulate contaminate portions of the dirty fluid toward the first surrounding sidewall first end portion. In addition for the fluid filter apparatus, a secondary strainer is disposed as between the second environmental interior and the third environmental interior, wherein the secondary strainer is adjacent to the secondary end portion and a filter media is disposed within the third environmental interior. Wherein operationally, on the fluid filter apparatus the dirty fluid enters into the first environmental interior via the dirty fluid inlet aperture and communicates via the vane in the first environmental interior and on into the second environmental interior therethrough the primary strainer and the fluid further communicating into the third environmental interior therethrough the secondary strainer, and further the fluid communicates therethrough the filter media with the substantially purified fluid communicating onward through the outlet aperture.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
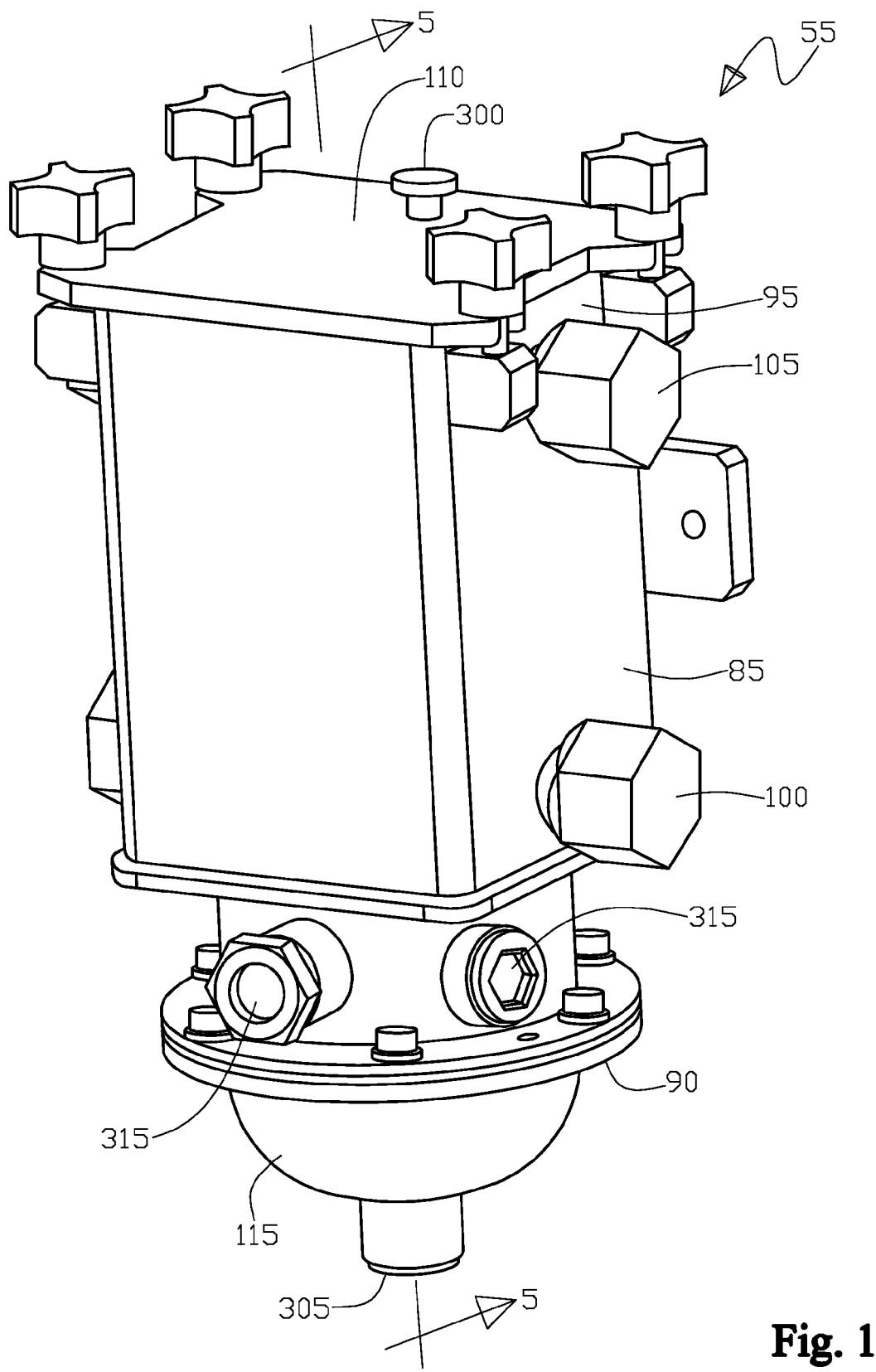
FIG. 1 shows a perspective view of the fluid filter apparatus having the inlet and outlet apertures covered, further shown is the first surrounding sidewall and its first and second end portions, the cover, the dome, the vent, the magnetic drain, plus the auxiliary ports.

50 Fluid filter element assembly
55 Fluid filter apparatus
60 Fluid
65 Dirty fluid 60
70 Particulate contaminates
75 Heavier fluid 60
80 Substantially purified fluid 60
85 First surrounding sidewall
90 First end portion of the first surrounding sidewall 85
95 Second end portion of the first surrounding sidewall 85
100 Dirty fluid inlet aperture
105 Outlet aperture
110 Cover
115 Domed end
120 Second surrounding sidewall
125 Primary end portion of the second surrounding sidewall 120
130 Secondary end portion of the second surrounding sidewall 120
135 Co-axial disposing of the second 120 and first 85 surrounding sidewalls
140 First environmental interior
145 Second environmental interior
150 Third environmental interior
155 Primary strainer
160 Secondary strainer
165 Filter media
170 Vane
175 Continuous helical channel formed by the vane 170

180 Imparting a continuous centrifugal velocity to the dirty fluid 65 from the continuous helical channel 175 formed by the vane 170
185 Proximate to the primary strainer 155
190 Frustroconical shape of the primary strainer 155
195 Continuation of the primary end portion of the second surrounding sidewall 120
200 Lower centrifugal velocity of the dirty fluid 65 having fewer heavier fluids 75 and fewer particulate contaminates 70
205 Higher centrifugal velocity of the dirty fluid 65 having heavier fluids 75 and particulate contaminates 70 being driven towards the first surrounding sidewall 85 first end portion 90
210 Frustroconical shape of the secondary strainer 160
215 Structurally disposed within a majority of the second environmental interior 145 for the secondary strainer 160 frustroconical shape 210
220 Substantially parallel relationship as between the secondary strainer 160 frustroconical shape 210 and the second surrounding sidewall 120
225 Coalescing chamber
230 Fluid flow cross sectional area of the coalescing chamber 225
235 Fluid flow cross sectional area of the second environmental interior 145
240 Reducing the fluid velocity to allow for further settling out of heavier fluids 75 and particulate contaminates 70 prior to the fluid entering the filter media 165
300 Vent for third environmental interior 150
305 Magnetic drain plug
310 Transfer valve for dual filter system
315 Auxiliary port

DETAILED DESCRIPTION

Figure 2:
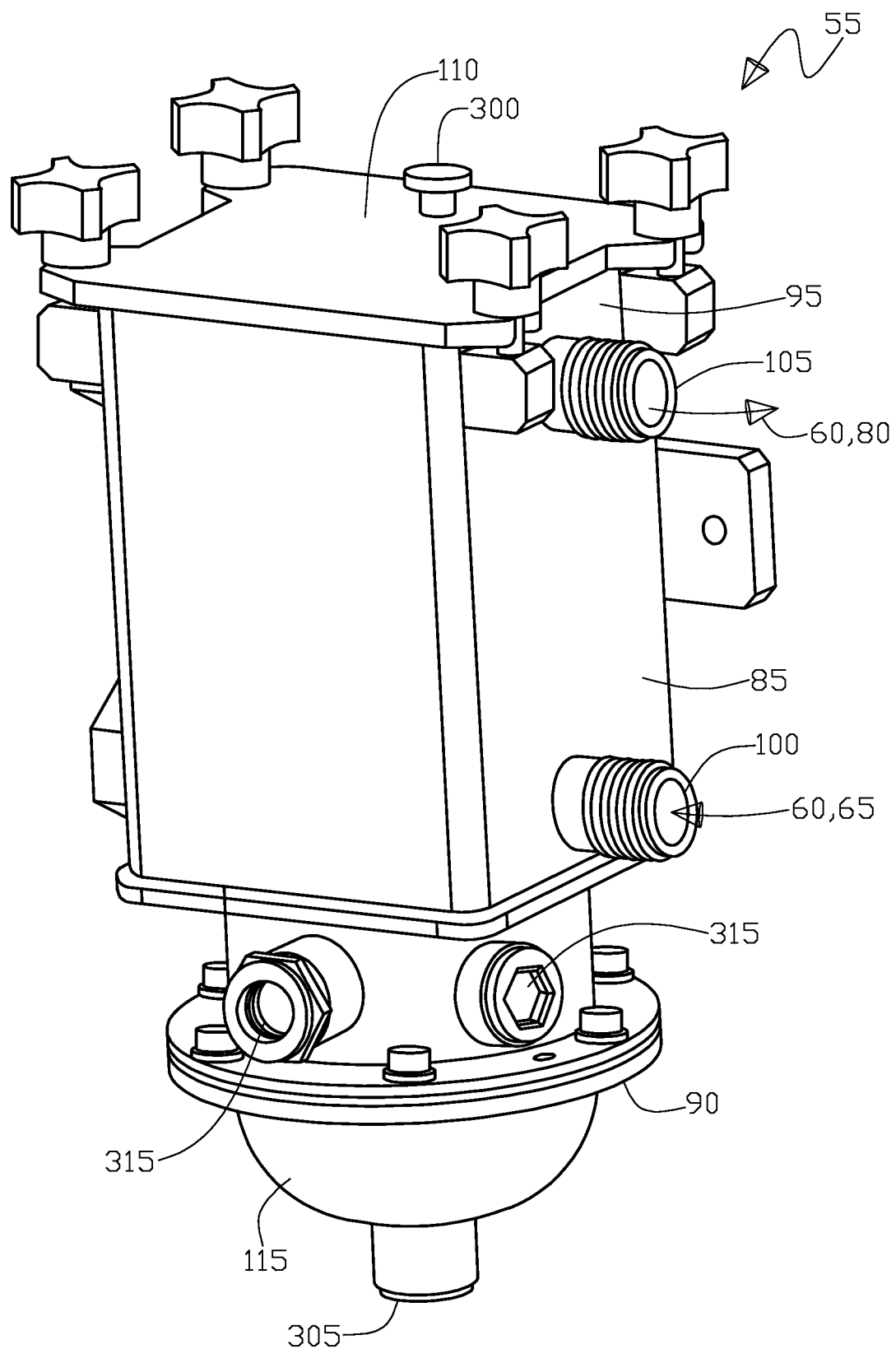
FIG. 2 shows a perspective view of the fluid filter apparatus having the inlet and outlet apertures open, further shown is the first surrounding sidewall and its first and second end portions, the cover, the dome, the vent, the magnetic drain, plus the auxiliary ports.

Broadly, with initial reference to FIG. 1 shown is a perspective view of the fluid filter apparatus 55 having the inlet 100 and outlet 105 apertures covered, further shown is the first surrounding sidewall 85 and its first 90 and second 95 end portions, the cover 110, the dome 115, the vent 300, the magnetic drain 305, plus the auxiliary ports 315. Next, FIG. 2 shows a perspective view of the fluid filter apparatus 55 having the inlet 100 and outlet 105 apertures open, further shown is the first surrounding sidewall 85 and its first 90 and second 95 end portions, the cover 110, the dome 115, the vent 300, the magnetic drain 305, plus the auxiliary ports 315. Continuing, FIG. 3 shows a side elevation view of the fluid filter apparatus 55 having the inlet 100 and outlet 105 apertures covered, further shown is the first surrounding sidewall 85 and its first 90 and second 95 end portions, the cover 110, the dome 115, the vent 300, the magnetic drain 305, plus the auxiliary ports 315.

Figure 3:
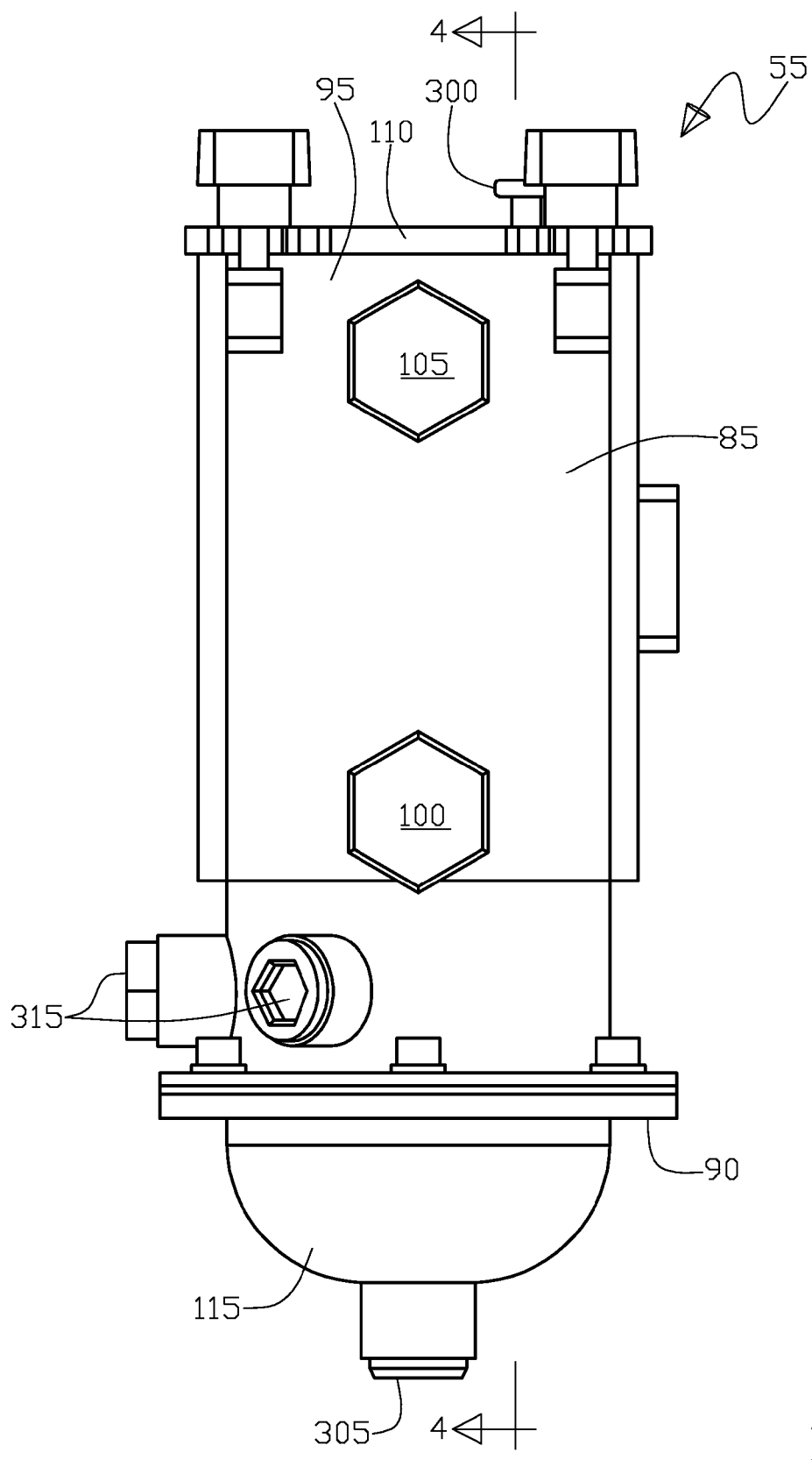
FIG. 3 shows a side elevation view of the fluid filter apparatus having the inlet and outlet apertures covered, further shown is the first surrounding sidewall and its first and second end portions, the cover, the dome, the vent, the magnetic drain, plus the auxiliary ports.
Figure 4:
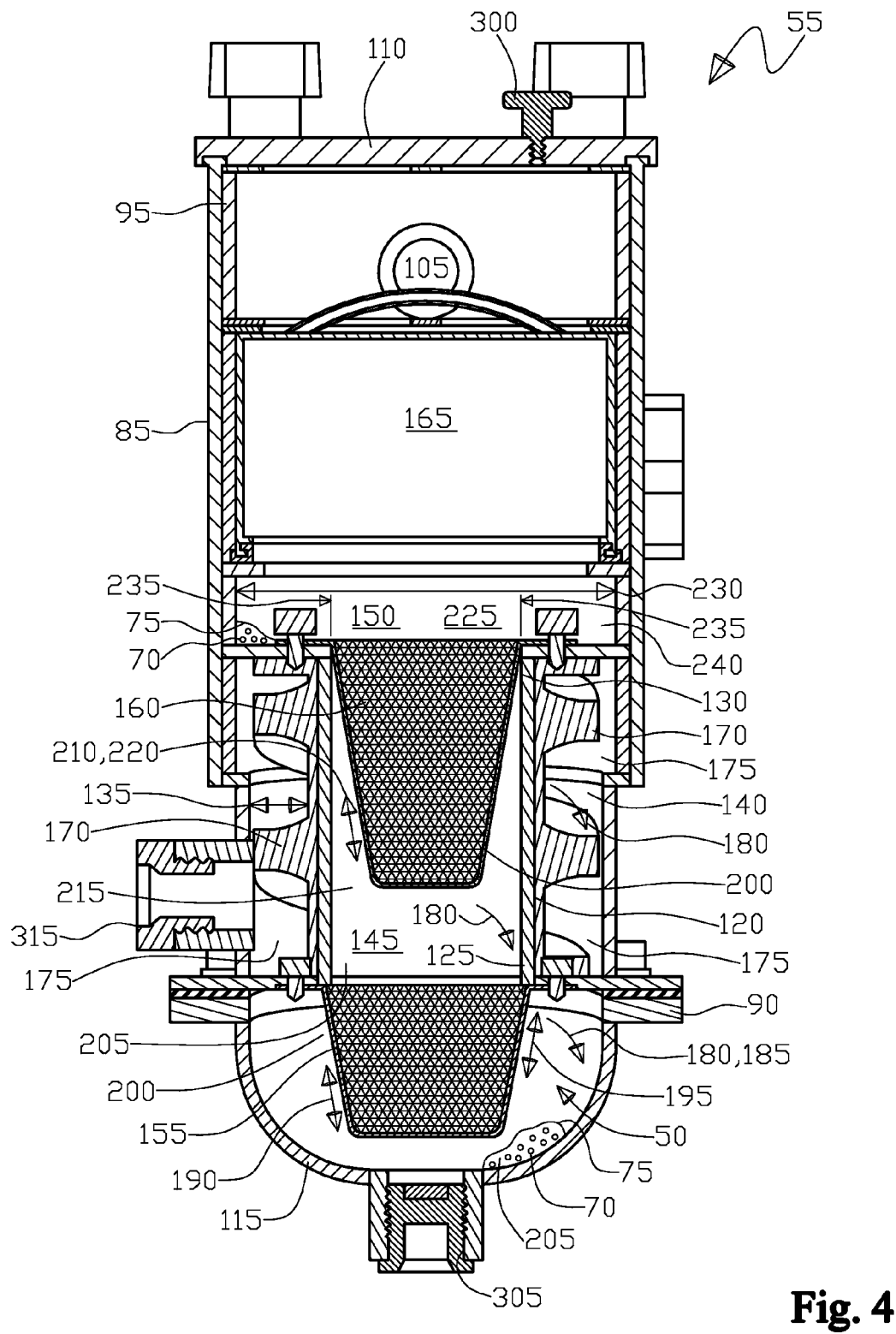
FIG. 4 shows cross section 4-4 from FIG. 3 to show the fluid filter apparatus internals that include showing the outlet aperture open, the first surrounding sidewall and its first and second end portions, the cover, the dome, the vent, the magnetic drain, plus the auxiliary ports, further shown is the primary and secondary strainers, the vane and the continuous helical channel, the filter media, along with the first, second, and third environmental interiors, plus the coalescing chamber.
Figure 5:
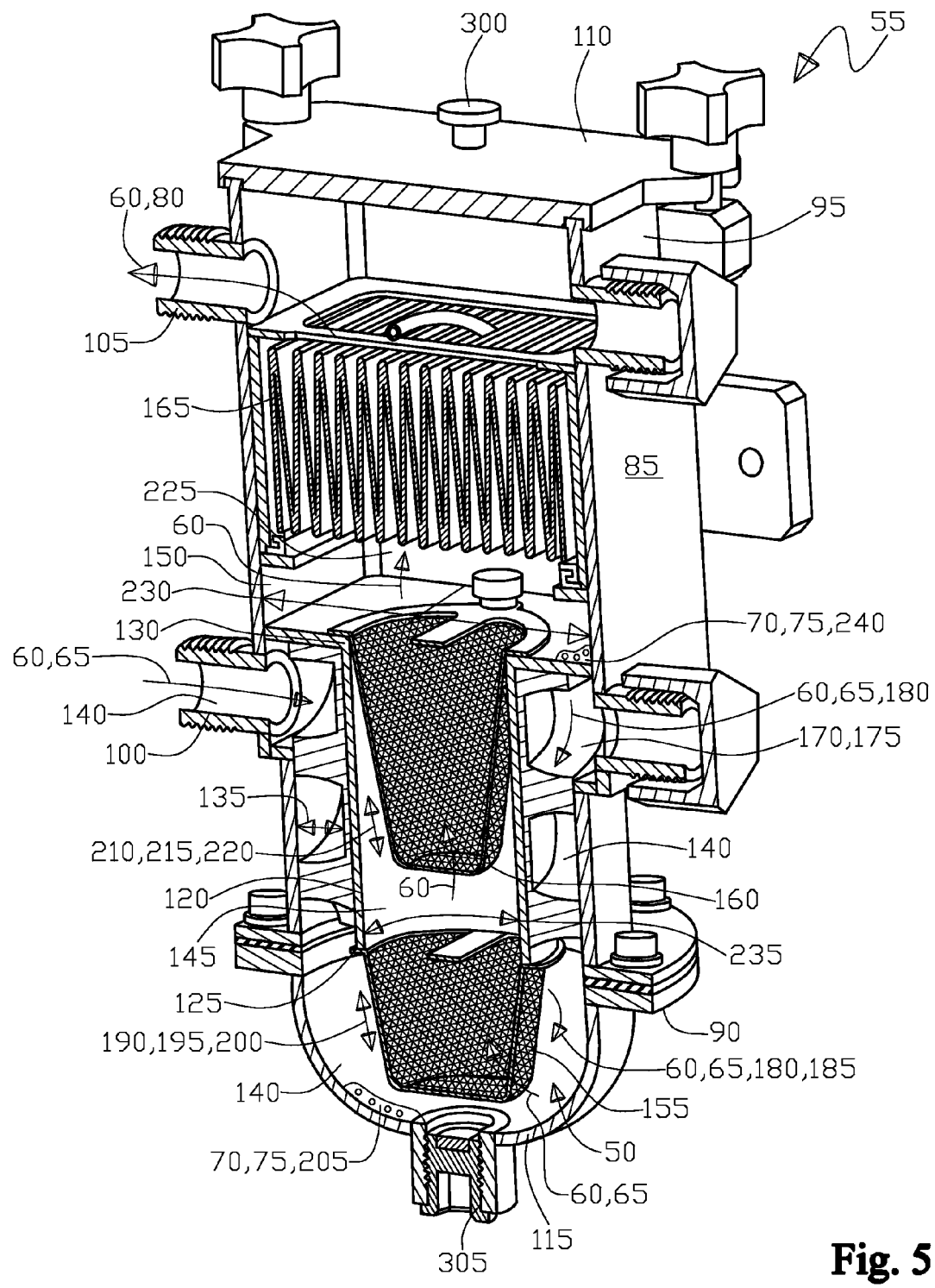
FIG. 5 shows cross section 5-5 from FIG. 1 to show the fluid filter apparatus internals that include showing the inlet dirty fluid in aperture and the outlet purified fluid out aperture, the first surrounding sidewall and its first and second end portions, the cover, the dome, the vent, the magnetic drain, plus the auxiliary ports, further shown is the primary and secondary strainers, the vane and the continuous helical channel, the filter media, along with the first, second, and third environmental interiors, plus the coalescing chamber, and the coalescing fluid flow area and the second environmental interior fluid flow area along with the path of fluid flow therethrough the fluid filter apparatus from the inlet aperture to the outlet aperture.

Next, FIG. 4 shows cross section 4-4 from FIG. 3 to show the fluid filter apparatus 55 internals that include showing the outlet aperture 105 open, the first surrounding sidewall 85 and its first 90 and second 95 end portions, the cover 110, the dome 115, the vent 300, the magnetic drain 305, plus the auxiliary ports 315, further shown is the primary 155 and secondary 160 strainers, the vane 170 and the continuous helical channel 175, the filter media 165, along with the first 140, second 145, and third 150 environmental interiors, plus the coalescing chamber 225. Continuing, FIG. 5 shows cross section 5-5 from FIG. 1 to show the fluid filter apparatus 55 internals that include showing the inlet dirty fluid in the aperture 100 and the outlet purified fluid 80 out aperture 105, the first surrounding sidewall 85 and its first 90 and second 95 end portions, the cover 110, the dome 115, the vent 300, the magnetic drain 305, plus the auxiliary ports 315, further shown is the primary 155 and secondary 160 strainers, the vane 170 and the continuous helical channel 175, the filter media 165, along with the first 140, second 145, and third 150 environmental interiors, plus the coalescing chamber 225, and the coalescing fluid flow area 230 and the second environmental interior fluid flow area 235 along with the path of fluid flow 60 therethrough the fluid filter apparatus 55 from the inlet 100 aperture to the outlet 105 aperture.

Figure 6:
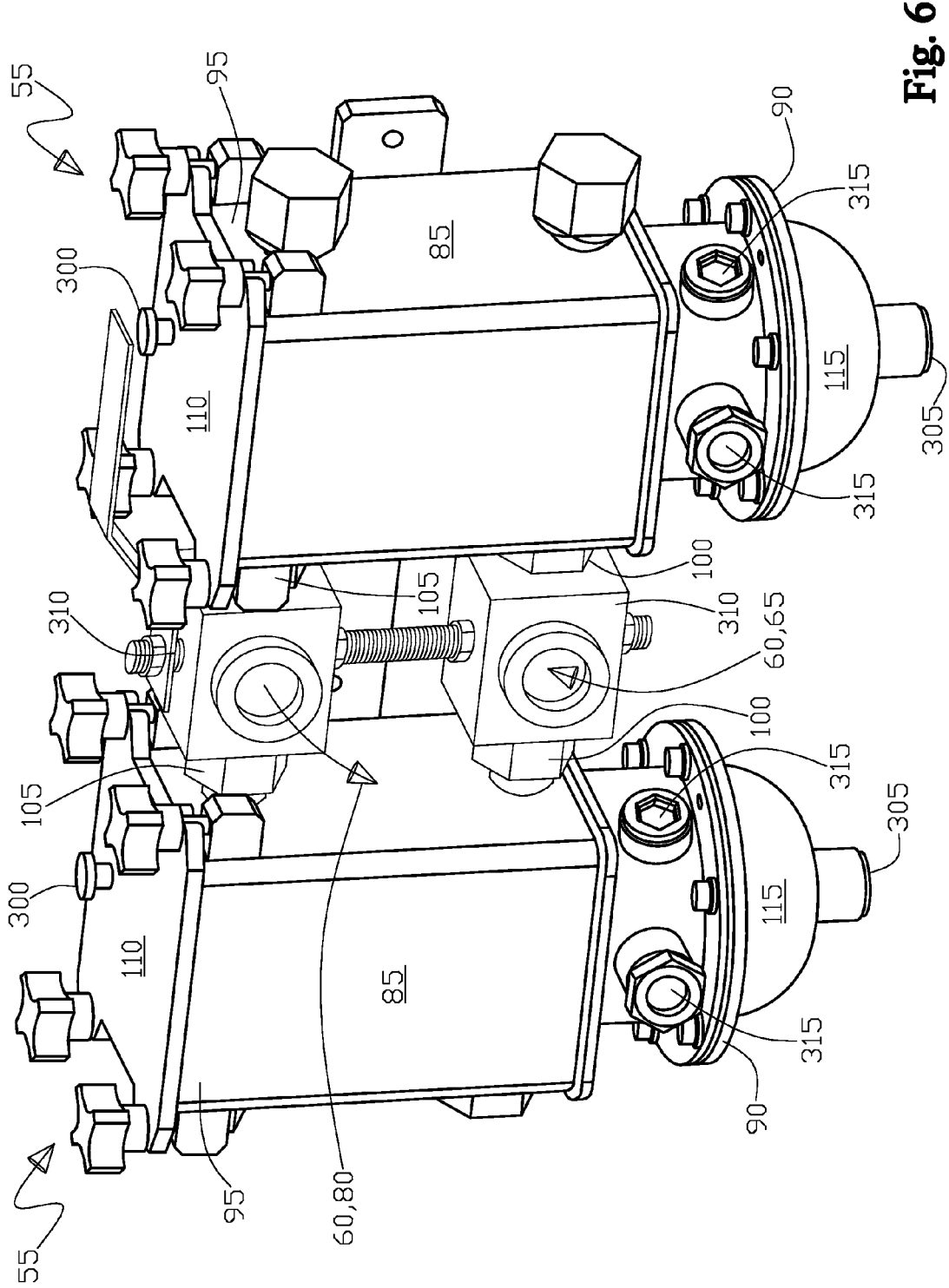
FIG. 6 shows a pair of fluid filter apparatus used in conjunction with a transfer valve to allow use of either filter while the other filter is being serviced or to use both filters simultaneously.
Figure 7:
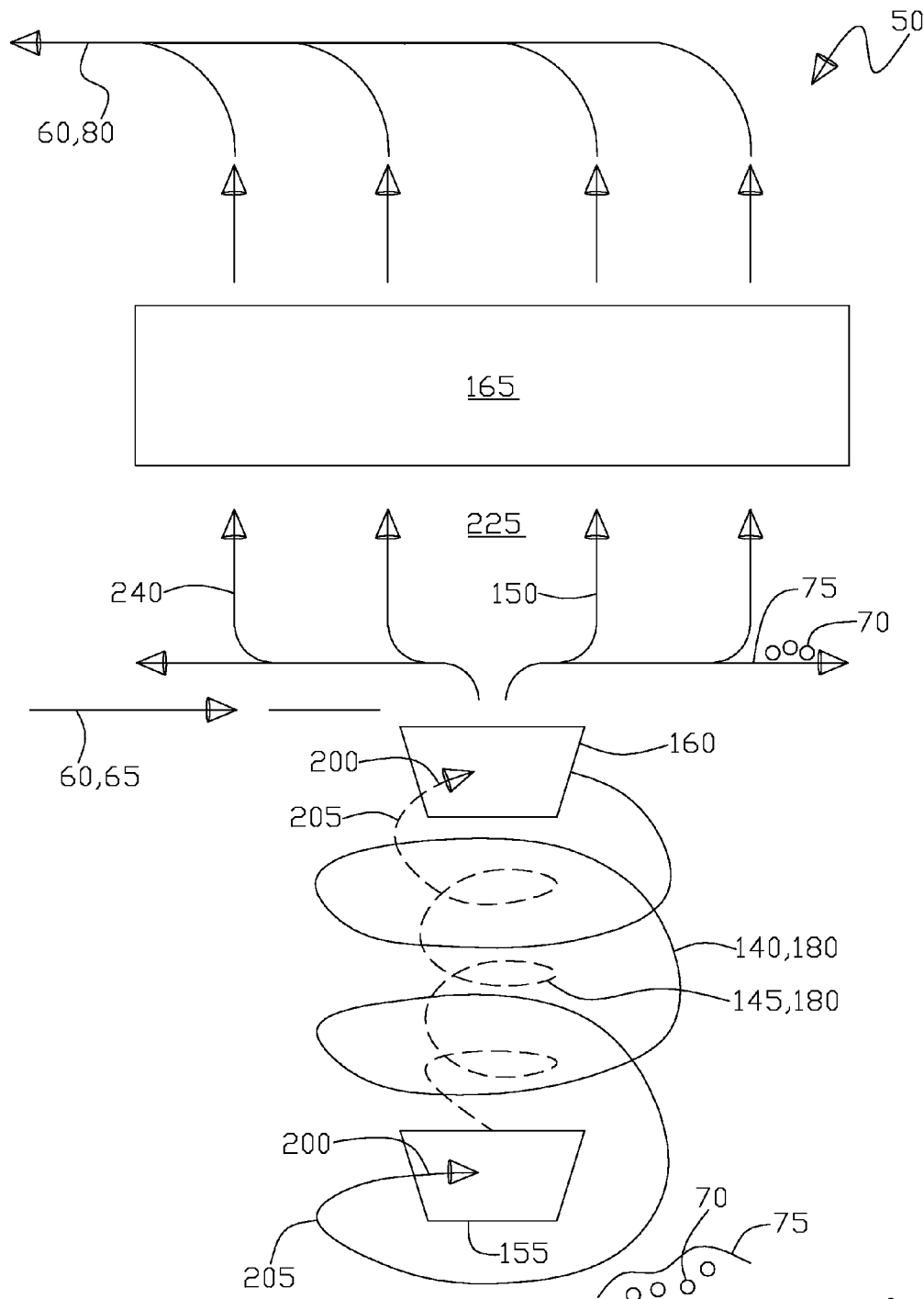
FIG. 7 shows a schematic diagram of primarily fluid flow through the fluid filter apparatus in proceeding from the dirty fluid inlet to imparting a continuous centrifugal velocity to the dirty fluid from the continuous helical channel vane in the first environmental interior and then proceeding to the primary strainer which is adjacent to the lower centrifugal velocity fluid, then through the primary strainer and while the fluid still has a degree of centrifugal velocity in the second environmental interior proceeding to the secondary strainer which is adjacent to the lower centrifugal velocity fluid, then through the secondary strainer into the third environmental interior and into the coalescing chamber wherein the fluid velocity is slowed down prior to entering the filter media, wherein the purified fluid exits the filter media and proceeds onto the outlet aperture.

Next, FIG. 6 shows a pair of fluid filter apparatus 55 used in conjunction with a transfer valve 310 to allow use of either filter apparatus 55 while the other filter apparatus 55 is being serviced or to use both filter apparatus 55 simultaneously. Further, FIG. 7 shows a schematic diagram of primarily fluid flow 60 through the fluid filter apparatus 55 in proceeding from the dirty fluid inlet 100 to imparting a continuous centrifugal velocity 180 to the dirty fluid 65 from the continuous helical channel vane 175 in the first environmental interior 140 and then proceeding to the primary strainer 155 which is adjacent to the lower centrifugal velocity fluid 200. Also, FIG. 7 shows the fluid 60 then going through the primary strainer 155 and while the fluid 60 still has a degree of the higher centrifugal velocity 205 in the second environmental interior 145 proceeding to the secondary strainer 160 which is adjacent to the lower centrifugal velocity fluid 200, then through the secondary strainer 160 into the third environmental interior 150 and into the coalescing chamber 225 wherein the fluid velocity is slowed down 240 prior to entering the filter media 165, wherein the purified fluid 80 exits the filter media 165 and proceeds into the outlet aperture 105.

In referencing FIGS. 4, 5, and 7 the fluid filter element assembly 50 for helping to purify 80 a fluid 60 is shown, being essentially the internals termed the fluid filter element assembly 50, to allow for any type of outer housing to be utilized as follows that includes a first surrounding sidewall 85 having a first end portion 90 and an opposing second end portion 95, with a second surrounding sidewall 120 including a primary end portion 125 and an opposing secondary end portion 130. Wherein the second surrounding sidewall 120 is substantially co-axially disposed 135 within the first surrounding sidewall 85, with the primary end portion 125 adjacent to the first end portion 90 and the secondary end portion 130 adjacent to the second end portion 95. Further, the first environment interior 140 is defined as being disposed as between the first 85 and second 120 surrounding sidewall, a second environmental interior 145 is defined as being disposed within the second surrounding sidewall 120, and a third environmental interior 150 is defined as being disposed within the first surrounding sidewall 85, where the second surrounding sidewall 120 does not extend into.

Also included in the fluid filter element assembly 50 is a primary strainer 155 disposed as between the first environment interior 140 and the second environment interior 145, wherein the primary strainer 155 is adjacent to the primary end portion 125. In addition, a secondary strainer 160 is disposed as between the second environmental interior 145 and the third environmental interior 150, wherein the secondary strainer 160 is adjacent to the secondary end portion 130. Also a filter media 165 is disposed within the third environmental interior 150, wherein operationally a dirty 65 fluid 60 enters into the first environmental interior 140 and communicates into the second environmental interior 145 therethrough the primary strainer 155 and the fluid 60 further communicating into the third environmental interior 150 therethrough the secondary strainer 160, and further the fluid 60 communicates therethrough the filter media 165.

As an option for the fluid filter element assembly 50, could further include a vane 170 disposed within the first environmental interior 140, wherein operationally the vane 170 imparts a centrifugal velocity 180 to the dirty 65 fluid 60 to substantially separate out the heavy matter that is in the dirty fluid typically in the form of particulates 70 and heavier fluids 75. Further on the vane 170, it can form a continuous helical channel 175 within the first environmental interior 140 to direct the dirty 65 fluid 60 from the secondary end portion 130 to the primary end portion 125 to be proximate 185 to the primary strainer 155.

Moving to detail on the primary strainer 155, for the fluid filter element assembly 50, the primary strainer 155 is formed into a frustroconical shape 190 that structurally forms a continuation 195 of the second surrounding sidewall 120 primary end portion 125, that is operational to substantially maximize the primary strainer 155 exposure to the first environmental interior portion 140 where the dirty 65 fluid 60 is at a lower centrifugal velocity 200 having fewer heavier fluids 75 and fewer particulate contaminates 70. Looking at the secondary strainer 160, for the fluid filter element assembly 50, the secondary strainer 160 is formed into a frustroconical shape 210 that is structurally disposed 215 within a majority of the second environmental interior 145, wherein the secondary strainer 160 frustroconical shape 210 is substantially parallel 220 to the second surrounding sidewall 120, that is operational to substantially maximize the secondary strainer 160 exposure to the second environmental interior portion 145 where the fluid 60 is at a lower centrifugal velocity 200 having fewer heavier fluids 75 and fewer particulate contaminates 70.

Continuing, for the fluid filter element assembly 50, optionally the third environmental interior 150 can further include a coalescing chamber 225 disposed as between the secondary strainer 160 and the filter media 165, wherein the coalescing chamber 225 has a fluid flow cross sectional area 230 of at least two times that of a fluid flow cross sectional area 235 of the second environmental interior 145, wherein the coalescing chamber 225 is operational to reduce a velocity 240 of the fluid 60 to allow for further settling out of heavier fluids 75 and particulate contaminates 70 prior to the fluid 60 entering the filter media 165.

Broadly, in referencing FIGS. 1 through 5, including FIG. 7, the present invention of a fluid filter apparatus 55 for helping to purify 80 the fluid 60, includes the outer housing thus termed a complete apparatus 55 as follows includes a first surrounding sidewall 85 with a first end portion 90 and an opposing second end portion 95, wherein the second end portion 95 includes a dirty fluid inlet aperture 100 disposed therethrough the first surrounding sidewall 85, further the second end portion 95 also includes an outlet aperture 105 also therethrough the first surrounding sidewall 85. Further included in the fluid filter apparatus 55 is a cover 110 that is attached to the second end portion 95 and a domed end 115 that is attached to the first end portion 90. Moving internally on the fluid filter apparatus 55 further included is a second surrounding sidewall 120 with a primary end portion 125 and an opposing secondary end portion 130, wherein the second surrounding sidewall 120 is substantially co-axially disposed 135 within the first surrounding sidewall 85, with the primary end portion 125 adjacent to the first end portion 90 and the secondary end portion 130 adjacent to the second end portion 95. Also included in the fluid filter apparatus 55 is a first environment interior 140 that is defined as being disposed as between the first 85 and second 120 surrounding sidewalls, a second environmental interior 145 that is defined as being disposed within the second surrounding sidewall 120, and a third environmental interior 150 that is defined as being disposed within the first surrounding sidewall 85 where the second surrounding sidewall 120 does not extend into.

The fluid filter apparatus 55 also includes a primary strainer 155 disposed as between the first environment interior 140 and the second environment interior 145, wherein the primary strainer 155 is adjacent to the primary end portion 125, further a vane 170 that forms a continuous helical channel 175 within the first environmental interior 140 that is operational to direct the dirty 65 fluid 60 from the fluid inlet aperture 100 to the primary strainer 155 and to add a centrifugal velocity 180 to the fluid 60 in order to drive heavier fluid portions 75 and particulate contaminate portions 70 of the dirty 65 fluid 60 toward the first surrounding sidewall 85 first end portion 90. In addition for the fluid filter apparatus 55, a secondary strainer 160 is disposed as between the second environmental interior 145 and the third environmental interior 150, wherein the secondary strainer 160 is adjacent to the secondary end portion 130, and a filter media 165 is disposed within the third environmental interior 150. Wherein operationally, looking in particular at FIGS. 4, 5, and 7, on the fluid filter apparatus 55, the dirty 65 fluid 60 enters into the first environmental interior 140 via the dirty fluid inlet aperture 100 and communicates via the vane 170 in the first environmental interior 140 and on into the second environmental interior 145 therethrough the primary strainer 155 and the fluid 60 further communicating into the third environmental interior 150 therethrough the secondary strainer 160, and further the fluid 60 communicates therethrough the filter media 165 with the substantially purified 80 fluid 60 communicating onward through the outlet aperture 105.

Further on the fluid filter apparatus 55 and moving to detail on the primary strainer 155 for the fluid filter apparatus 55, the primary strainer 155 is formed into a frustroconical shape 190 that structurally forms a continuation 195 of the second surrounding sidewall 120 primary end portion 125, that is operational to substantially maximize the primary strainer 155 exposure to the first environmental interior portion 140 where the dirty 65 fluid 60 is at a lower centrifugal velocity 200 having fewer heavier fluids 75 and fewer particulate contaminates 70. Looking at the secondary strainer 160, for the fluid filter element assembly 50, the secondary strainer 160 is formed into a frustroconical shape 210 that is structurally disposed 215 within a majority of the second environmental interior 145, wherein the secondary strainer 160 frustroconical shape 210 is substantially parallel 220 to the second surrounding sidewall 120, that is operational to substantially maximize the secondary strainer 160 exposure to the second environmental interior portion 145 where the fluid 60 is at a lower centrifugal velocity 200 having fewer heavier fluids 75 and fewer particulate contaminates 70.

Continuing, for the fluid filter apparatus 55, optionally the third environmental interior 150 can further include a coalescing chamber 225 disposed as between the secondary strainer 160 and the filter media 165, wherein the coalescing chamber 225 has a fluid flow cross sectional area 230 of at least two times that of a fluid flow cross sectional area 235 of the second environmental interior 145, wherein the coalescing chamber 225 is operational to reduce a velocity 240 of the fluid 60 to allow for further settling out of heavier fluids 75 and particulate contaminates 70 prior to the fluid 60 entering the filter media 165.

Referring in particular to FIGS. 4, 5, and 7, for the fluid filter element assembly 50 or the fluid filter apparatus 55 in particular for fluid 60 flow; starting at where the dirty 65 fluid enters at aperture 100 with the fluid 60 being preferably an engine fuel where the vane 170 system gives the centrifugal 180 effect, the water 75 and heavier particles 70 will settle to the bottom of the dome 115. Wherein, there is an option to remove the water 75 and particles 70 via draining at 305. Next, the primary strainer 155 being disposed in the first environmental interior 140 is preferably a cleanable stainless steel mesh element that will separate smaller water droplets and particles in the frustroconical bowl 190 for easy removal. This stainless mesh for the primary strainer 155 is available in 100 or 200 micron absolute cleanable mesh, further the primary strainer 144 can coalesce the fluid 60. Continuing, inside the second environmental interior 145 the secondary strainer 160 is preferably also a stainless steel mesh strainer to bring the filtration to even finer level. The secondary strainer 160 will preferably use a cleanable 40 or 60 micron absolute mesh. Next, in the third environmental interior 150 below the final element filter media 165 the flow area increases in the coalescing chamber 225 via the flow area 230 of the coalescing chamber 225 at two times or greater of the flow area 235 of the second environmental interior 145 that allows the emulsified water 75 and smaller particles 70 to settle out prior the filter media 165. The filter media 165 is preferably a 10 or a 30 micron absolute media, being 99.9% absolute filtration at a 30 micron rating and a 99.6% absolute filtration at a 10 micron rating, wherein the substantially purified fuel 80 exits at aperture 105.

Also, for the fluid filter element assembly 50 or the fluid filter apparatus 55 the current fluid 60, as preferably being an engine fuel has a flow rate range of about one-hundred and eighty (180) to two-thousand sixty (2,060) gallons per hour, with a water removal efficiency of 99% and an ABS or IMO temperature rating of one-thousand seven hundred (1,700) degrees Fahrenheit.

CONCLUSION

Accordingly, the present invention of a filter apparatus 50 or 55 has been described with some degree of particularity directed to the embodiments of the present invention. It should be appreciated, though, that the present invention is defined by the following claims construed in light of the prior art so modifications of the changes may be made to the exemplary embodiments of the present invention without departing from the inventive concepts contained therein.

The invention claimed is:

1. A fluid filter element assembly for helping to purify a fluid, comprising:
   (a) a first surrounding sidewall including a first end portion and an opposing second end portion,
   (b) a second surrounding sidewall including a primary end portion and an opposing secondary end portion, wherein said second surrounding sidewall is substantially co-axially disposed within said first surrounding sidewall, with said primary end portion adjacent to said first end portion and said secondary end portion adjacent to said second end portion, a first environment interior is defined as being disposed as between said first and second surrounding sidewall, a second environmental interior is defined as being disposed within said second surrounding sidewall, and a third environmental interior is defined as being disposed within said first surrounding sidewall;
   (c) a primary strainer disposed as between said first environment interior and said second environment interior, wherein said primary strainer is adjacent to said primary end portion;
   (d) a secondary strainer disposed as between said second environmental interior and said third environmental interior, wherein said secondary strainer is adjacent to said secondary end portion; and
   (e) a filter media disposed within said third environmental interior, wherein operationally a dirty fluid enters into said first environmental interior and communicates into said second environmental interior therethrough said primary strainer and the fluid further communicating into said third environmental interior therethrough said secondary strainer, and further the fluid communicates therethrough said filter media.

2. A fluid filter element assembly according to claim 1, further comprising a vane disposed within said first environmental interior, wherein operationally said vane imparts a centrifugal velocity to the dirty fluid.

3. A fluid filter element assembly according to claim 2, wherein said vane is forms a continuous helical channel within said first environmental interior to direct the dirty fluid from said secondary end portion to said primary end portion to be proximate to said primary strainer.

4. A fluid filter element assembly according to claim 3, wherein said primary strainer is formed into a frustroconical shape that structurally forms a continuation of said second surrounding sidewall primary end portion, that is operational to substantially maximize said primary strainer exposure to said first environmental interior portion where the dirty fluid is at a lower centrifugal velocity having fewer heavier fluids and fewer particulate contaminates.

5. A fluid filter element assembly according to claim 4, wherein said secondary strainer is formed into a frustroconical shape that is structurally disposed within a majority of said second environmental interior, wherein said secondary strainer frustroconical shape is substantially parallel to said second surrounding sidewall, that is operational to substantially maximize said secondary strainer exposure to said second environmental interior portion where the fluid is at a lower centrifugal velocity having fewer heavier fluids and fewer particulate contaminates.

6. A fluid filter element assembly according to claim 5, wherein said third environmental interior further comprises a coalescing chamber disposed as between said secondary strainer and said filter media, wherein said coalescing chamber has a fluid flow cross sectional area of at least two times that of a fluid flow cross sectional area of said second environmental interior, said coalescing chamber is operational to reduce a velocity of the fluid to allow for further settling out of heavier fluids and particulate contaminates prior to the fluid entering said filter media.

7. A fluid filter apparatus for helping to purify a fluid, comprising:
   (a) a first surrounding sidewall including a first end portion and an opposing second end portion, wherein said second end portion includes a dirty fluid inlet aperture disposed therethrough said first surrounding sidewall, further said second end portion also includes an outlet aperture therethrough said first surrounding sidewall;
   (b) a cover that is attached to said second end portion;
   (c) a domed end that is attached to said first end portion;
   (d) a second surrounding sidewall including a primary end portion and an opposing secondary end portion, wherein said second surrounding sidewall is substantially co-axially disposed within said first surrounding sidewall, with said primary end portion adjacent to said first end portion and said secondary end portion adjacent to said second end portion, a first environment interior is defined as being disposed as between said first and second surrounding sidewalls, a second environmental interior is defined as being disposed within said second surrounding sidewall, and a third environmental interior is defined as being disposed within said first surrounding sidewall;

(e) a primary strainer disposed as between said first environment interior and said second environment interior, wherein said primary strainer is adjacent to said primary end portion;

(f) a vane that forms a continuous helical channel within said first environmental interior that is operational to direct the dirty fluid from said fluid inlet aperture to said primary strainer and to add a centrifugal velocity to the fluid to drive heavier fluid portions and particulate contaminate portions of the dirty fluid toward said first surrounding sidewall first end portion;

(g) a secondary strainer disposed as between said second environmental interior and said third environmental interior, wherein said secondary strainer is adjacent to said secondary end portion; and (h) a filter media disposed within said third environmental interior, wherein operationally the dirty fluid enters into said first environmental interior via said dirty fluid inlet aperture and communicates via said vane in said first environmental interior and on into said second environmental interior therethrough said primary strainer and the fluid further communicating into said third environmental interior therethrough said secondary strainer, and further the fluid communicates therethrough said filter media with the substantially purified fluid communicating onward through said outlet aperture.

8. A fluid filter element assembly according to claim 7, wherein said primary strainer is formed into a frustroconical shape that structurally forms a continuation of said second surrounding sidewall primary end portion, that is operational to substantially maximize said primary strainer exposure to said first environmental interior portion where the dirty fluid is at a lower centrifugal velocity having fewer heavier fluids and fewer particulate contaminates.

9. A fluid filter element assembly according to claim 8, wherein said secondary strainer is formed into a frustroconical shape that is structurally disposed within a majority of said second environmental interior, wherein said secondary strainer frustroconical shape is substantially parallel to said second surrounding sidewall, that is operational to substantially maximize said secondary strainer exposure to said second environmental interior portion where the fluid is at a lower centrifugal velocity having fewer heavier fluids and fewer particulate contaminates.

10. A fluid filter element assembly according to claim 9, wherein said third environmental interior further comprises a coalescing chamber disposed as between said secondary strainer and said filter media, wherein said coalescing chamber has a fluid flow cross sectional area of at least two times that of a fluid flow cross sectional area of said second environmental interior, said coalescing chamber is operational to reduce a velocity of the fluid to allow for further settling out of heavier fluids and particulate contaminates prior to the fluid entering said filter media.

* * * * *